(12) United States Patent
Ishimaru et al.

(10) Patent No.: US 7,204,146 B2
(45) Date of Patent: Apr. 17, 2007

(54) DEVICE AND METHOD FOR MEASURING THICKNESS

(75) Inventors: Ichiro Ishimaru, Kita-gun (JP); Takahiro Okuda, Takamatsu (JP)

(73) Assignee: Techno Network Shikoku Co., Ltd., Kagawa (JP)

(*) Notice: Subject to any disclaimer, the term of this patent is extended or adjusted under 35 U.S.C. 154(b) by 0 days.

(21) Appl. No.: 11/368,095

(22) Filed: Mar. 2, 2006

(65) Prior Publication Data

US 2006/0144147 A1 Jul. 6, 2006

Related U.S. Application Data

(63) Continuation of application No. PCT/JP04/12817, filed on Sep. 3, 2004.

(30) Foreign Application Priority Data

Sep. 5, 2003 (JP) .............................. 2003-313350

(51) Int. Cl.
*G01N 29/46* (2006.01)
(52) U.S. Cl. ...................... 73/579; 73/655; 73/659
(58) Field of Classification Search ............ 73/579, 73/655, 657, 659, 597, 602; 356/357, 351, 356/360, 361, 345, 432

See application file for complete search history.

(56) References Cited

U.S. PATENT DOCUMENTS 6,006,593 A * 12/1999 Yamanaka ................. 73/105
6,038,026 A * 3/2000 Maris ......................... 356/514
6,057,927 A * 5/2000 Levesque et al. ............ 356/432
6,128,081 A * 10/2000 White et al. ................. 356/503
6,172,752 B1 * 1/2001 Haruna et al. ............... 356/503
6,958,817 B1 * 10/2005 Zhu et al. .................... 356/498

FOREIGN PATENT DOCUMENTS

| JP | 52-018591 | 2/1977 |
| JP | 04-191652 | 7/1992 |
| JP | 05-001910 | 1/1993 |
| JP | 2001-343365 | 12/2001 |
| JP | 2003-222616 | 8/2003 |

OTHER PUBLICATIONS

S. Nagai, et al., *Material Evaluation by Laser-Excited Ultrasonic Waves*, Ultrasonic TECHNO (1999), pp. 50-54.
T. Sawada, *Photothermal Spectroscopy and Its Applications*, Japanese Society of Spectroscopy.

* cited by examiner

*Primary Examiner*—Hezron Williams
*Assistant Examiner*—Jacques Saint-Surin
(74) *Attorney, Agent, or Firm*—Beyer Weaver & Thomas LLP

(57) ABSTRACT

A device for measuring thickness of an object has a vibration generator for generating vibrations in the object, a vibration detector for detecting vibrations generated in the object by the vibration generator and a frequency analyzer for calculating resonance frequency of the object. The vibration generator includes a light-emitting part which emits light towards the object to irradiate and to be absorbed by the object. A plurality of vibration detectors may be used and the frequency analyzer may include a sound speed analyzer for calculating speed of sound inside the object from vibrations detected by these plurality of vibration detectors.

14 Claims, 4 Drawing Sheets

DEVICE AND METHOD FOR MEASURING THICKNESS

This application is a continuation of International Application No. PCT/JP2004/012817, filed Sep. 3, 2004 which claims priority on Japanese Patent Application 2003-313350 filed Sep. 5, 2003.

BACKGROUND OF THE INVENTION

This invention relates to the measurement of the thickness of an object. In particular, this invention relates to a device for and a method of measuring not only the overall thickness of an object but also the thickness of a thin film formed on the surface of an object, as well as the thickness of each layer of a multi-layered object.

It is a common practice to form a painted film on the surface of an automobile body or the like in order to prevent the rust generation or material degradation due to corrosion or to improve its external appearance. Polarization films and anti-reflection films are surface-coated for changing the optical characteristic of the film. It is important to control the thickness of such films because it affects not only the characteristics of the film itself but also the characteristics of the object on which the film is formed.

Conventional methods for measuring the thickness of a coated film include the displacement measurement method which makes use of a displacement sensor and the quantitative measurement method by which the change in mass of an object is measured before and after a film is formed. The former is a method of calculating the thickness of a film from the position of the surface of the object before the film is formed and the position of the surface of the formed film. Since it requires the technology of accurate positioning because the reference surface of the displacement sensor and the surface of the object must always be positioned carefully for making a comparison and since a measurement must be made both before and after the film is formed, it is a cumbersome method. The latter is a simpler method because only the mass of the object is measured before and after the film is formed and no very accurate technology not required but it is not capable of an accurate measurement if the film is much lighter or thinner than the object on which it is formed.

In view of the problems of such prior art methods, Japanese Patent Publications Tokkai 52-18591 and 2000-165369, as well as Japanese Patent 3019510, for example, have disclosed a new technology for measuring the thickness of a film simply and accurately by generating a resonance within the film and measuring its thickness based on its frequency and the speed of sound through the material of the film.

According to the technology of Japanese Patent Publication Tokkai 52-18591 (Ref. 1), an ultrasonic probe in contact with an object is vibrated in order to inject ultrasonic waves into the object. Thus, the resonance frequency of the film can be obtained by varying the frequency of vibrations of the probe to change the frequency of the incident ultrasonic vibrations, and the film thickness can be calculated from the resonance frequency thus obtained. If the thickness of the portion contacted by the probe can be measured, the thickness of any portion can be obtained reliably.

According to the technology of Japanese Patent 3019510 (Ref. 2), pulsed ultrasonic waves are injected from a probe in contact with the object. The resonance frequency of the object can be obtained by analyzing the vibrations of the object caused by the injected ultrasonic waves, and the thickness of the film can be obtained from this resonance frequency. If the thickness of the portion contacted by the probe can be measured, the thickness of any portion can be obtained reliably.

According to the technology of Japanese Patent Publication Tokkai 2000-165369 (Ref. 3), an eddy current is caused inside the film by means of an electromagnetic ultrasonic sensor and vibrations are caused inside the film by mechanical vibrations of the film caused by this eddy current. Since the resonance frequency of the film can be obtained by analyzing the vibrations thus generated inside the film, the thickness of the film can be obtained by one measurement as by the technology of Ref. 2.

The technologies of Refs. 1 and 2 allow the thickness of the contacted portion of a film by the probe to be accurately measured but are likely to cause contamination or damage to the contacting surface portion of the object to be measured and hence these methods cannot be used, for example, on the surface of a carbon crucible of an oven for lifting single crystalline silicon which is processed with a black carbon material because, if there is a contaminant attached to this carbon film, the interior of silicon becomes contaminated as the single crystalline silicon is grown. When it is desired to measure the thickness of a film extending over a large area such as the film coating of an automobile body, furthermore, the ultrasonic probe for these methods will have to be moved over the entire automobile body and this makes it difficult to arrange and handle the cables connected to the probe.

The technology of Ref. 3 is convenient because it is capable of generating an eddy current inside a film without contacting its electromagnetic ultrasonic probe directly to the film and hence of measuring the film thickness in a non-contact mode but it is difficult to limit the region in which the eddy current is generated. Moreover, since the measured thickness is an average value over the region where the eddy current is generated, it is not possible to measure the thickness of a localized portion. Since an eddy current must be generated, furthermore, this method is applicable only to the measurement of thickness of a film of a ferromagnetic or electro-conductive material, that is, the thickness of a film of other materials cannot be measured by this method. Still another problem of this method is that the frequency of the vibrations that can be generated within a film by an electromagnetic ultrasonic sensor is at most about 10 MHz. Films with thickness about 0.1 mm may be measurable theoretically but it is difficult to measure a film thickness less than 5 mm as a practical matter. Since a disproportionately large amount of energy must be inputted to the sensor compared to the energy of vibrations that are generated in the film, a large current is required for the sensor and a large-size equipment will be required.

SUMMARY OF THE INVENTION

It is therefore an object of this invention to provide a method and a device for measuring thickness of a localized portion of an object accurately and in a non-contacting manner, independently of the nature of the object material and even if the object is a very thin film.

It is another object of this invention to provide such a method and a device that are compact and energy-efficient.

A device of this invention for measuring thickness of an object is characterized as comprising a vibration generator for generating vibrations in the object, a vibration detector for detecting vibrations generated in the object by the vibration generator and a frequency analyzer for calculating resonance frequency of the object and wherein the vibration generator includes a light-emitting part which emits light towards the object to irradiate the object, the light having wavelength that is absorbable by the object.

The device of this invention may further comprise a light-converging device that serves to converge the light irradiating the object, and the emitted light may be pulsed light. The vibration detector is preferably a non-contact vibration detector adapted to detect vibrations in the object without contacting the object, and the non-contact vibration detector may use light interference for vibration detection.

The device of this invention may comprise a plurality of vibration detectors and the frequency analyzer may be provided with a sound speed analyzer for calculating speed of sound inside the object from vibrations detected by the plurality of vibration detectors. The frequency analyzer may be provided with a sound speed analyzer for calculating speed of sound inside the object from vibrations detected by the vibration detector, while the light-emitting part operates to emit pulsed light a plural number of times and the vibration detector is moved to different positions according to the timing of emission of the pulsed light.

A method of measuring thickness of an object according to this invention may be characterized as comprising the steps of causing light to be emitted from a light-emitting part of a vibration generator towards an object to irradiate the object, the light having wavelength that is absorbable by the object, and causing energy of the light to be absorbed by the object to thereby cause vibrations in the object, detecting the vibrations caused in the object by a vibration detector and using a frequency analyzer to calculate resonance frequency of the object by frequency analysis of the detected vibrations and calculating thickness of the object from the calculated resonance frequency.

In the above, the light may be converged by a light-converging device to irradiate the object, and the light may be pulsed light.

The vibration detector may be one of a plurality of vibration detectors and the method may further comprise the step of calculating speed of sound inside the object from vibrations detected by the plurality of vibration detectors.

The light-emitting part may emit pulsed light a plural number of times and the method may further comprise the steps of moving the vibration detector to one of different positions each time the light-emitting part emits pulsed light and calculating speed of sound inside the object from the vibrations detected at these different positions by the vibration detector.

DETAILED DESCRIPTION OF THE INVENTION

Embodiments of this invention are described next with reference to drawings.

Devices for measuring thickness according to this invention are characterized as causing vibrations within an object and measuring the thickness of the object by obtaining the resonance frequency of the object from the caused vibrations wherein the so-called photothermal conversion effect whereby energy of incident light onto an object is converted into thermal energy inside the object is used as the means for causing the vibrations within the object. In the above, "light" being a form of electromagnetic waves, expression "light" may be replaced with "electromagnetic waves" such that the energy of electromagnetic waves is to be converted into thermal energy inside an object. For the convenience of description, however, the invention is herein described only for situations where light is made incident onto a target object to be measured.

The basic principle of the invention is described next with reference to FIG. 3 for a situation where the thickness of a film formed on the surface of an object is to be measured.

Figure 3A:
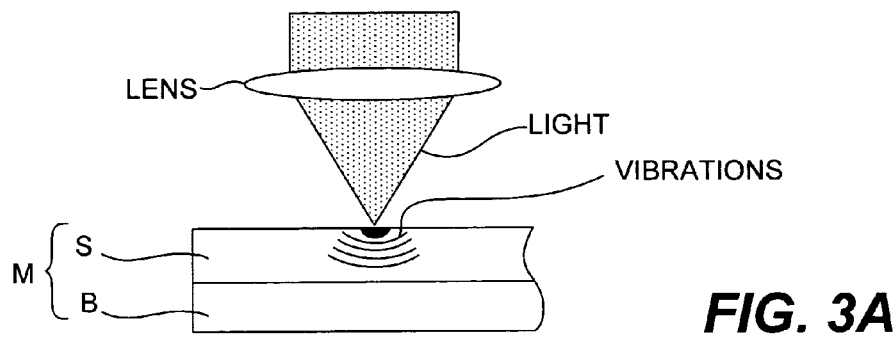
FIGS. 3A and 3B, together referred to as FIG. 3, are drawings for showing the basic principle of measurement of thickness according to this invention.

FIG. 3A shows light with a specified wavelength made incident on the surface of a film S over an object M. If the film S is opaque to the incident light, or if the film S is not entirely transparent to the incident light, a portion of the light energy according to the spectral absorption coefficient of the film S corresponding to this wavelength is absorbed by the film S. The absorbed energy is converted into thermal energy within the surface layer of the film S and heat is generated at a depth (referred to as the thermal diffusion length μ) below the film surface. The thermal diffusion length is given as follows:

$$\mu = (k/(\rho C_P \pi f))^{1/2}$$

where K is the thermal diffusion coefficient, ρ is the density, $C_P$ is the specific heat and f is the frequency of light intensity modulation. The formula indicates that the thermal diffusion length μ is shorter for a greater modulation frequency. Although the thermal diffusion coefficient changes, depending on the material, the thermal diffusion length μ is roughly of the order of 10 μm for a solid when the modulation frequency is 1 kHz (See T. Sawada, "Photothermal Conversion Spectroscopy and Its Applications," p 21, published by Gakkai Publishing Center) and the thermal diffusion length μ becomes less than 1 μm if the modulation frequency is about 1 MHz–10 MHz.

As heat is generated in the surface layer of the film S, the surface layer undergoes a thermal expansion and then shrinks as the generated heat is radiated and diffused away to the surrounding parts. In other words, the surface layer of the film S vibrates in the direction of its thickness and this vibratory motion propagates inside the film. Since the vibrations that propagate inside the film S are reflected at boundary surfaces such as the boundary surface between the film S and air and that between the film S and the base material B on which the film S is formed where a relative difference exists in acoustic impedance, the phenomenon of resonance corresponding to its thickness is generated in the film S between these two boundary surfaces, caused by the vibrations generated by thermal expansion and shrinkage of the surface layer of the film S.

Figure 3B:
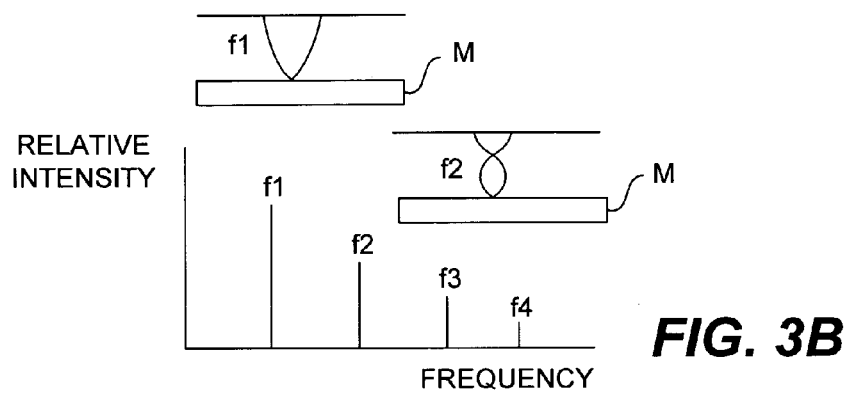

The acoustic impedance Z is given as Z=ρc where c is the sound speed. If the acoustic impedance Z of the film S is greater than that of the base material B, a resonance is generated with a free end at the boundary surface between the film S and air and a closed end at the boundary surface between the film S and the base material B, as shown in FIG. 3B. In this case, since (2n−1)/4 times its wavelength becomes equal to the film thickness D where n is an integer, the film thickness D can be obtained as follows:

$$D=((2n-1)/4)*(V/f) \qquad \text{Formula (1)}$$

where f is the resonance frequency and V is the sound speed inside the film.

Although the wavelength of each resonance frequency is equal to (2n−1)/4 times that of the principal mode (shown as f1 in FIG. 3B), the film thickness D can be calculated by using only the principal mode (corresponding to f1) because the intensities of the overtone modes are weaker, the accuracy of measurement can be improved by using a plurality of frequencies (including overtone frequencies such as f2, f3 and f4 as shown in FIG. 3B).

Figure 1:
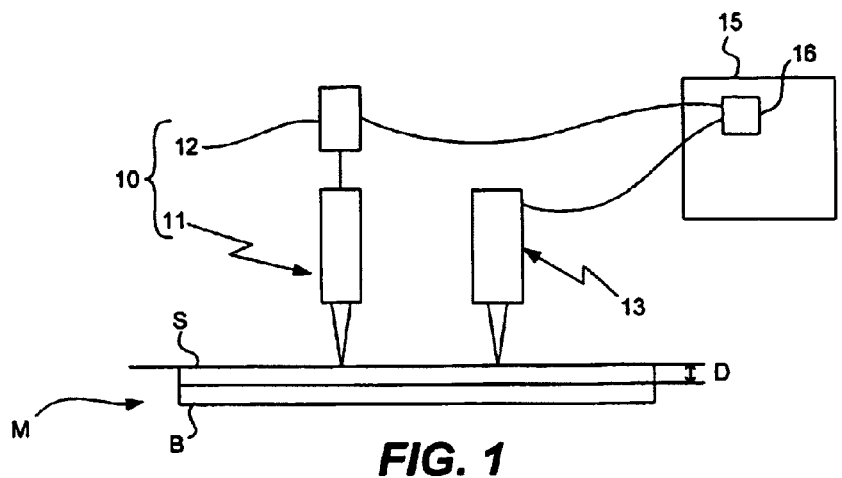
FIG. 1 is a schematic diagram of a thickness measuring device embodying this invention.

FIG. 1 is referenced next to explain a measurement device 1 embodying this invention.

In FIG. 1, symbol M again indicates an object with a base material B having formed on its surface a target film S of which the thickness is to be measured. A light-emitting part 11 of a vibration generator 10 is disposed near this object M. This is for the purpose of generating light for irradiating the film S of the object M and is connected to a light source 12 for generating light to be projected onto the object M.

The light source 12 may comprise a pulsed laser such as an ArF laser, a nitrogen laser, a $CO_2$ laser or a YAG laser but is not limited to these examples as long as it is capable of providing the light-emitting part 11 with pulsed light of a wavelength that can be absorbed by the film S with a sufficient light intensity for generating vibrations by the photothermal effect.

As shown in FIG. 1, a vibration detector 13 is provided on the side of the object M as the light-emitting part 11 of the vibration generator 10. This is a non-contact type vibration detector such as a laser doppler oscillator of the optical interference type, adapted to detect vibrations of the film S without contacting the object M or its film S.

When light is used to measure surface vibrations as described above, and especially when the surface is rough, it is known that there are problems that the reflected light from such a surface is diffused or scattered and an appropriate interference pattern is not obtained, and various optical systems have been proposed for overcoming such problems (So Nagai, et al., "Material Evaluation by Laser Excited Ultrasonic Waves—Applications to Sound Speed Measurement and Non-Destructive Investigations," Ultrasonic Wave TECHNO, pp. 50–54 (July, 1999)). Thus, the vibration detector 13 according to this embodiment of the invention may also incorporate such prior art technologies, if necessary, in view of the surface condition such roughness and reflectivity.

The vibration detector 13 is connected to a frequency analyzer 15. Data related to the vibrations of the film S such as its vibration waveform are inputted to this frequency analyzer 15 from the vibration detector 13, and the frequency analyzer 15 is adapted to analyze these data to calculate the thickness D of the film S from the resonance frequency of the film S and the sound speed inside the film S. The frequency analyzer 15 may be adapted to obtain the resonance frequency in the film S by the FFT (Fast Fourier Transform) analysis of the vibration waveform of the film S, for example, but this is not a necessary requirement as long as it is capable of detecting the resonance frequency from the vibration waveform detected by the vibration detector 13.

Figure 2A:
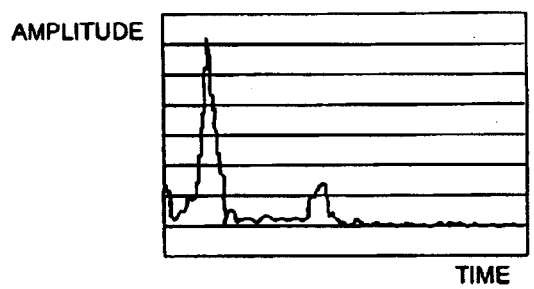
FIG. 2A shows an example of vibrations detected by the vibration detector.

The frequency analyzer 15 is provided with an electrical high pass filter for eliminating low frequency components and the function of eliminating low frequency components by means of software. As shown in FIG. 2A, the vibration waveform of the film S detected by the vibration detector 13 includes not only resonant vibrations in the direction of the thickness but also a non-negligible amount of resonant vibrations in the direction along the surface of the base material B (hereinafter referred to as the longitudinal direction of the film S). Thus, after an FFT analysis is carried out, there will be peaks both in resonant frequencies in the direction of the thickness and the longitudinal direction of the film S, but since the frequency of the resonant vibrations of the film S in the longitudinal direction is lower than that in the direction of the thickness, it is possible to measure only the desired frequency component in the direction of the thickness by providing the frequency analyzer 15 with an electrical high-pass filter for eliminating low-frequency components or a function of eliminating low-frequency components by software means.

On the other hand, it is also possible to measure the length of the film S in its longitudinal direction based on its resonance frequency in the longitudinal direction. Let L be the length of the film S in its longitudinal direction. If there is no support at the edges of the plate, or if the plate has free ends at both edges, the length of the film S in its longitudinal direction can be obtained as follows:

$$L=((2n-1)/2)*(V/f) \qquad \text{Formula (2)}$$

where n is an integer. If one of the ends is supported, it is given as follows:

$$L=((2n-1)/4)*(V/f)) \qquad \text{Formula (3)}$$

where n is an integer. In Formulas (2) and (3), V indicates the sound speed of the transverse waves or the planar waves. If the longitudinal and transverse dimensions of the film S are substantially different, both lengths may be obtained because resonance frequencies corresponding to both are generated.

When the length of a film S formed on a very elongated object M such as a rolled plate is measured, means for eliminating low-frequency components such as an electrical high-pass filter is not required. In the case of such a film, the frequencies associated with longitudinal vibration modes are extremely low and their intensities are negligibly weak. Thus, the vibration waveform of the film S detected by the vibration detector 13 can be directly analyzed by the frequency analyzer 15 to accurately obtain the resonance frequency within the film S.

With a device of this invention thus structured for measuring thickness, vibrations can be caused inside the film S by the photothermal effect by applying the light from the light source 12 by means of the light-emitting part 11. If the vibration detector 13 is used to detect the vibration waveform of the film S, its resonance frequency can be obtained by the frequency analyzer 15 and the thickness D of the film S can be calculated from this resonance frequency and the sound speed inside the film S. Since the optical path of the light can be easily changed by using mirrors and prisms, the position for measuring the film thickness can be freely selected.

Since pulsed light is used on the object M, the vibrations generated inside the film S contain a wide range of frequency components. This means that the range of frequencies causing resonance is wide, or that films with thicknesses in a wide range can be measured by this method. If the half-band width of the pulse is made narrower, furthermore, the vibrations generated in the film S come to include high-frequency components. If the time of irradiation of the pulsed light is made shorter to make its half-band width narrower, its waveform becomes closer to a delta function. It is well known that the Fourier transform of a delta function include all frequency components. In other words, the frequency for generating resonance inside the film S can be made higher by reducing the half-band width of the pulsed light to make its waveform closer to a delta function. In still other words, even thin films can be measured because the resonance frequency can be made shorter. For example, films with thickness about 10 µm, coating the surface of a plate of aluminum, copper or glass can be measured according to this invention.

It is most convenient to use a pulsed laser as the light source 12 but use may equally well be made of a continuous-oscillation laser or a light source other than a laser as long as the intensity is sufficiently strong. For example, an acoust-optics (AO) modulation element may be used to modulate the illumination intensity to supply pulsed light to the light-emitting part 11.

The wavelength of the light from the light emitting part 11 needs only to be such that its energy can be absorbed by the film S. If an ArF laser is used, for example, since light with wavelength of 193 nm emitted therefrom is transparent only to a material such as calcium fluoride, the present invention may be considered applicable to the measurement of thickness of almost all materials.

Since the vibration detector 13 is of a non-contact type, the film thickness can be measured by this invention in a completely non-contact manner without the problem of contamination of or injury to the film surface by the measurement. The invention is used conveniently, for example, for the measurement of the thickness of the black carbon film on the crucible of an oven for lifting single crystalline silicon without adversely affecting the quality of the crucible.

If an oscillator of the light interference type such as a laser doppler oscillator is used as the vibration detector 13, in particular, the light therefrom may be made convergent, focusing near the position illuminated by the light from the light-emitting part 11 of the vibration generator 10. In this manner, vibrations generated in the direction of the thickness of the film S can be directly detected and hence the detection sensitivity can be improved.

It goes without saying that the vibration detector 13 need not necessarily be of a kind making use of optical interference as long as it is capable of detecting the film vibrations without contacting the object M or the film S. Optical detectors of the confocal kind or of the triangulation type, as well as non-contact vibration detectors not using light may be employed. Even a contact-type acoustic emission (AE) sensor may be acceptable if there is no particular problem of contamination caused by the contact of the detector on the film surface, the arrangement of wiring or trouble of mechanism for contact with the film.

Figure 4:
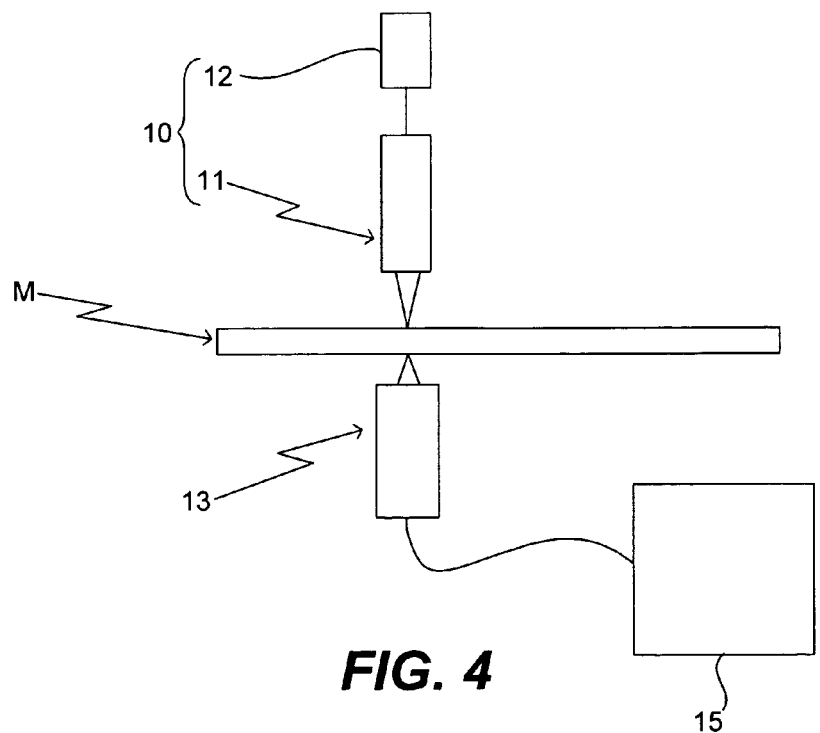
FIG. 4 is a schematic diagram of another thickness measuring device embodying this invention.

The thickness measuring device of this invention is capable of measuring not only the thickness of a film S formed on the surface of a base material B but also the thickness of an object M itself without any film S formed on its surface, as shown in FIG. 4. This may be done by applying light onto the object M from the light-emitting part 11 of the vibration generator 10 so as to cause expansions and contractions of the surface layer of the object M by the heat of the light. As vibrations are caused in the object M, they can be detected by the vibration detector 13, and the frequency analyzer 15 can be used to calculate the thickness of the object M itself. In summary, as long as heat can be caused to be absorbed by the surface layer, resonance is caused inside and its thickness can be calculated. Thus, even the thickness of a glass plate thicker than 100 µm, which is difficult to measure by a conventional method, can be measured by a device embodying this invention.

Figure 9A:
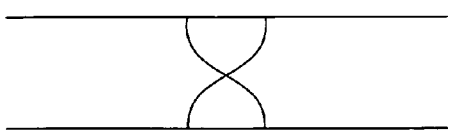
FIGS. 9A and 9B are diagrams for explaining resonance generated inside an object.

In this case, however, resonance is generated with free ends appearing on both edges of the object M as illustrated in FIG. 9A. Thus, the thickness D is obtained as follows:

$$D=((2n-1)/2)*(V/f)$$ Formula (4)

where n is an integer. If the object M is placed so as to be sandwiched between the vibration detector 13 and the light-emitting part 11, the vibrations generated inside the object M in the direction of its thickness can be directly measured and hence the resonance frequency can be more accurately obtained from the vibration waveform detected by the vibration detector 13.

Figure 5:
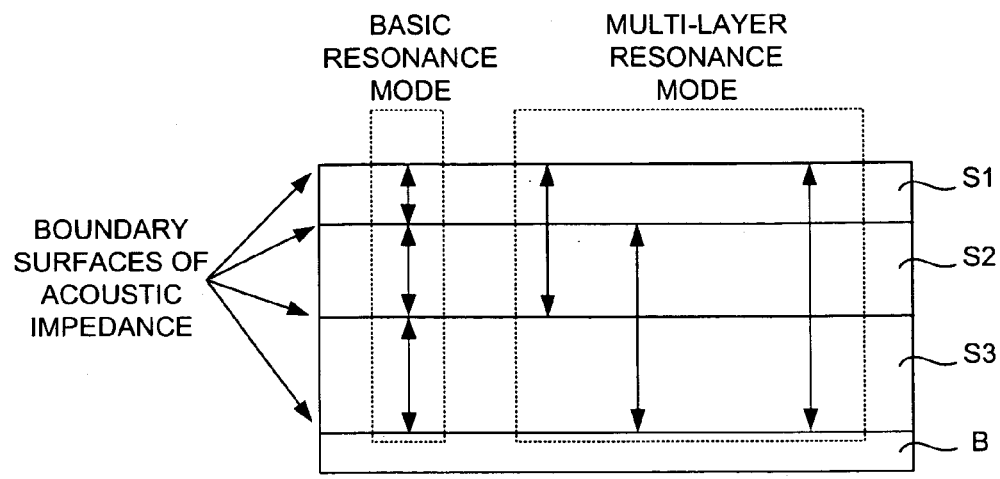
FIG. 5 is a diagram for showing resonance obtained in a plurality of layers.

Even where a plurality of films are formed on a base material or where a material is formed with a plurality of layers, the thickness of each layer can be measured by a measuring device of this invention. FIG. 5 shows an example where a film S is formed with three layers S1, S2 and S3. In such a situation, since reflections take place at each boundary surface and a resonance takes place inside each layer, resonance frequencies of the layers can be calculated by analyzing the vibration waveforms detected by the vibration analyzer 13 and the thickness of each layer can be measured.

Figure 6:
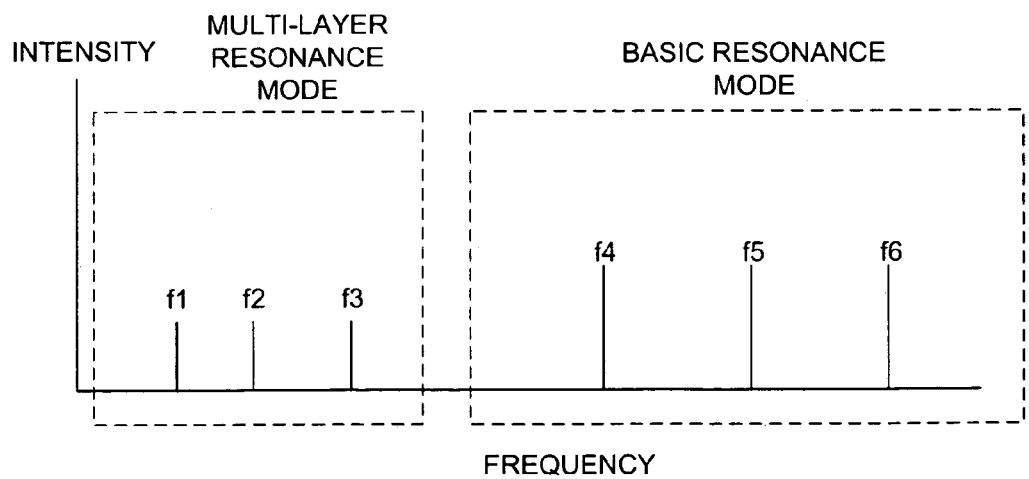
FIG. 6 is a diagram for showing resonance frequencies obtained in a plurality of layers.

The reflectivity at each boundary between two neighboring layers is given as $(Z1-Z2)/(Z1+Z2)$ if the acoustic impedance of each layer determined by the density of its constituent material is Z1 and Z2. Unless the reflectivity at each boundary surface is 100%, there appear resonance modes over a plurality of layers (hereinafter referred to as multi-layer resonance modes), in addition to the resonance modes inside the individual layers (hereinafter referred to as basic resonance modes), as shown in FIG. 5. In this case, if f1, f2 and f3 are the frequencies of the three basic resonance modes corresponding to the thicknesses of layers S1, S2 and S3, respectively, there also appear resonances (of multi-layer resonance mode) with resonance frequencies f4, f5 and f6 respectively corresponding to the total thickness of layers S1 and S2, that of layers S2 and S3 and that of layers S1, S2 and S3, as shown in FIG. 6. Since the vibration waveform detected by the vibration detector 13 includes all these resonance vibrations, the thickness of each layer can be calculated by analyzing the vibration waveform to obtain each resonance frequency. Thus, the accuracy of measured thicknesses can be improved by making use of the multi-layer resonance modes.

Figure 2B:
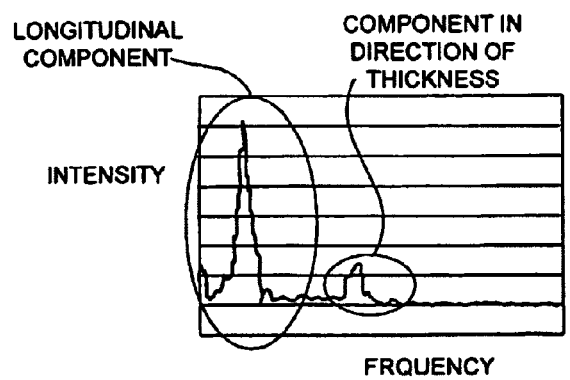
FIG. 2B is an example of result obtained by FFT analysis of vibrations.
Figure 9B:
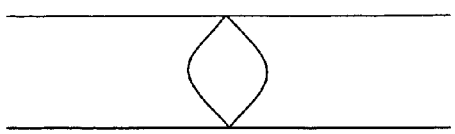

These resonances that are generated in the individual layers S1, S2 and S3 and over a plurality of these layers may have a free end or a fixed end at each of the boundary surfaces, depending on the relative differences in acoustic impedance between the resonating layer and the layers that sandwich it therebetween. Let us consider the resonance of the middle layer S2, for example. If the acoustic impedance of layer S2 is larger than those of layers S1 and S3, the resonance in layer S2 has both free ends (as shown in FIG. 9A). If the acoustic impedance of layer S2 is smaller than those of layers S1 and S3, the resonance in layer S2 has both fixed ends (as shown in FIG. 9B). In these cases, the thickness of layer S2 can be obtained from Formula (4). If the acoustic impedance of layer S2 is smaller than that of layer S1 and is larger than that of layer S3, the resonance in layer S2 has a free end at the boundary surface with layer S1 and a fixed end at the boundary with layer S3, as shown in FIG. 2, and the thickness of layer S2 is obtained from Formula (2).

If the relative difference in acoustic impedance between two neighboring layers is large, it is certain that the resonance in the layer with the larger acoustic impedance has a free end and that in the layer with the smaller acoustic impedance has a fixed end at the boundary, as explained above. If the difference in acoustic impedance between the layers is small, however, it is not easy to reliably conclude whether the resonance in each layer has an open end or a fixed end at the boundary only from the acoustic impedance. If the difference in acoustic impedance is not large, therefore, it is advisable to preliminarily ascertain whether the resonance in each layer has a free end or a fixed end at the boundary.

If the light-emitting part 11 of the vibration generator 10 is provided with means for converging the light for irradiation such as a converging lens ("light-converging device"), the area to be irradiated can be made very small. This means that light energy can be supplied to a small area and hence that vibrations of the film S in the direction of its thickness can be generated only in a small area where the light is applied and its immediate neighborhood. Thus, if the vibrations of the film S in the direction of its thickness detected by the vibration detector 13 are analyzed, the resonance frequency of the small irradiated area can be calculated and the thickness of this small area can be obtained very accurately. If an instrument for measuring vibrations by using light is used as the vibration detector 13, the diameter of the tip of its light probe can be made as small as a few μm. In this way, even the thickness of the opaque film coating the surface of an electronic component of less than few millimeters mounted to the electronic circuit board for a portable telephone or the like can be measured or, in particular, the thickness distribution within a small area.

Since a device of this invention can measure a local film thickness, it is also capable of measuring a local distribution of film thickness or of inspecting the uniformity of film thickness.

If the light converging means for the light-emitting part 11 is provided with the function of adjusting the degree of converging light, it becomes possible to adjust the area for absorbing light. This further makes it possible to measure the average film thickness of a specified area.

Since the energy density of light applied to the film S or the object M can be increased by converging the incident light, the power output of the light source 12 may be reduced and still light intensity sufficient for generating vibrations inside the film S or the object M by photothermal effect can be obtained. This makes it possible to make the device compact as a whole and to reduce the energy required for the measurement.

When the thickness of the film S is calculated, the sound speed inside the film S may be estimated from its constituent object and used for the calculation of the film thickness. On the other hand, sound speed inside the film S can be measured from the vibrations generated inside the film S such that its thickness can be even more accurately calculated. For this purpose, a sound speed analyzer 16 of the frequency analyzer 15 is connected to the light source 12 of the vibration generator 10 as shown in FIG. 1 such that the timing of oscillations of the pulsed light of the light source 12 is inputted to the frequency analyzer 15. The position of light irradiated by the light-emitting part 11 and the position at which vibrations are detected by the vibration detector 13 are preliminarily inputted to the sound speed analyzer 16 such that the sound speed inside the film S can be obtained from the delay between the timing of oscillation of the pulsed light and that of its detection by the vibration analyzer 13 and the distance between the position irradiated by the light and the position where the vibration analyzer 13 detects the vibrations.

The measured sound speed is the speed of transverse waves along the surface of the base material B. The sound speed analyzer 16 may be adapted to convert the sound speed of the transverse waves into that of longitudinal waves in the direction of the thickness of the film. If the thickness of the film S is calculated by using the sound speed of the longitudinal waves, the accuracy of calculation can be further improved.

In order to improve the measurement accuracy of the sound speed, it is important to improve the accuracy of the distance for the sound speed measurement. For this purpose, it is effective to reduce the area irradiated by the light-emitting part 11 and the area of measurement. If a laser is used as the light source 12 as the source of the vibration detector 13, distribution of the quantity of light at the irradiated area and the measurement area becomes a Gaussian distribution. Since the center of gravity of this intensity distribution becomes the center position of the irradiate area and the measurement area and the distance between them becomes the distance for the measurement of the sound speed, the error in the measurement can be reduced and the accuracy of the measurement can be improved.

In situations where the intensity distribution cannot be accurately measured or the distribution is not Gaussian, depending on the kind of the light source, a lens may be employed to converge light or the flux size may be reduced to make the irradiated area and the measurement area smaller.

Figure 7:
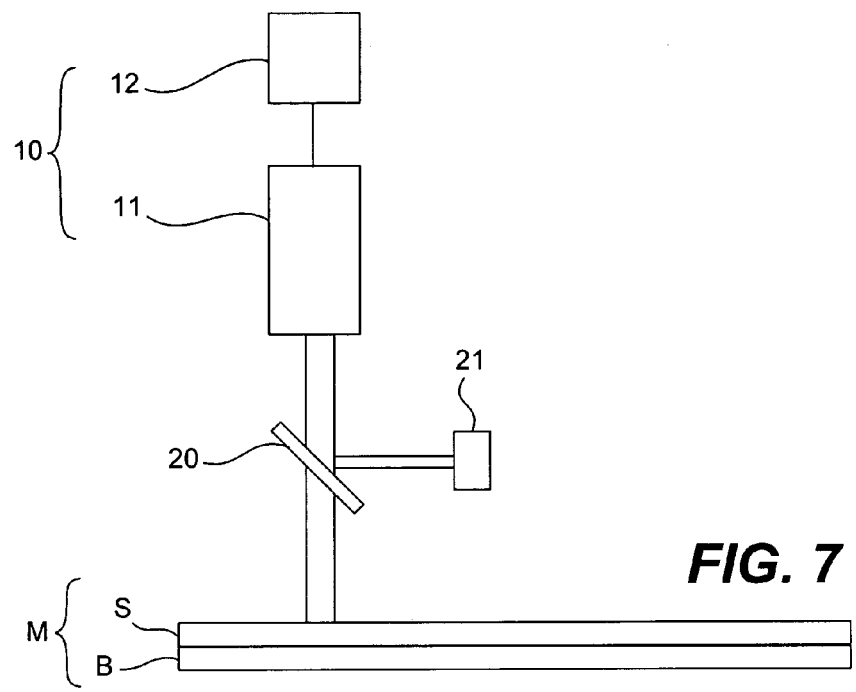
FIG. 7 is a schematic diagram for explaining the mechanism for detecting the vibration timing of pulsed light from the light source.

Instead of inputting the timing of light oscillation at the light source 12 into the frequency analyzer 15, a half mirror 20 may be set as shown in FIG. 7 on the optical axis between the light-emitting part 11 and the object M such that the reflected light is received by a photoelectric conversion element such as a photo-diode 21 to detect the emission time of the pulsed light and to input it to the sound speed analyzer 16. Since the pulsed light actually emitted is directly used as the trigger signal in this way, the timing delay between when the pulsed light is emitted and when the vibrations are detected by the vibration detector 13 can be measured more accurately.

When the light-emitting part 11 is adapted to emit pulsed light a plural number of times, a moving means (not shown) may be provided for moving along the surface of the film S on the object M such that the vibrating detector 13 is at a different position at each time of the pulsed emission. Data on the position of the vibration detector 13 are inputted from this moving means to the sound speed analyzer 16. In this manner, the sound speed inside the film S from the time delay from when the light-emitting part 11 emits pulsed light until when the vibration detector 13 detects vibrations, the time delay from when the light-emitter emits another pulse until when the vibration detector 13 detects vibrations and sound measuring distances at each measurement position.

Figure 8:
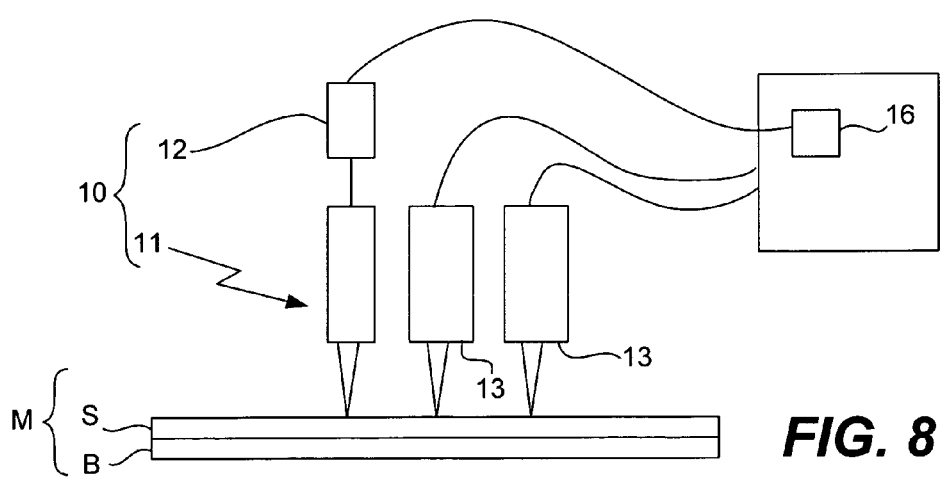
FIG. 8 is a schematic diagram of still another thickness measuring device embodying this invention.

If a plurality of vibration detectors 13 are set as shown in FIG. 8, the sound speed inside the film S can be calculated with pulsed light emitted only once, based on the time delay from when the single pulsed light is emitted until each of the vibration detectors 13 detects vibrations as well as the sound speed measuring distance of each vibration detector 13.

Devices and methods of this invention are applicable not only to opaque films such as metallic films but also for the measurement of film thickness distribution within a very small area such as a coated film on a small electronic component. Since measurements can be carried out easily, for example, by inserting an deflecting element such as a mirror or a prism in the optical path, it may be used in a wide variety of applications including the film coating of an automobile. Measurements may be made not only for single-layer films but also for multi-layer films.

What is claimed is:

1. A device for measuring thickness of an object, said device comprising:
   a vibration generator for generating vibrations in said object;
   a plurality of vibration detectors for detecting vibrations generated in said object by said vibration generator; and
   a frequency analyzer for calculating resonance frequency of said object, said frequency analyzer being provided with a sound speed analyzer for calculating speed of sound inside said object from vibrations detected by said plurality of vibration detectors;
   wherein said vibration generator includes a light-emitting part which emits light towards said object, said light having wavelength that is absorbable by said object.

2. The device of claim 1 further comprising a light-converging device that serves to converge said light irradiating said object.

3. The device of claim 1 wherein said emitted light is pulsed light.

4. The device of claim 1 wherein said vibration detector is a non-contact vibration detector adapted to detect vibrations in said object without contacting said object.

5. The device of claim 4 wherein said non-contact vibration detector uses light interference for vibration detection.

6. A device for measuring thickness of an object, said device comprising:
   a vibration generator for generating vibrations in said object;
   a vibration detector for detecting vibrations generated in said object by said vibration generator; and
   a frequency analyzer for calculating resonance frequency of said object;
   wherein said vibration generator includes a light-emitting part which emits pulsed light towards said object, said light having wavelength that is absorbable by said object; and
   wherein said frequency analyzer is provided with a sound speed analyzer for calculating speed of sound inside said object from vibrations detected by said vibration detector, while said light-emitting part operates to emit pulsed light a plural number of times and said vibration detector is moved to different positions according to the timing of emission of said pulsed light.

7. The device of claim 6 further comprising a light-converging device that serves to converge said light irradiating said object.

8. The device of claim 6 wherein said vibration detector is a non-contact vibration detector adapted to detect vibrations in said object without contacting said object.

9. The device of claim 8 wherein said non-contact vibration detector uses light interference for vibration detection.

10. A method of measuring thickness of an object, said method comprising the steps of:
    causing light to be emitted from a light-emitting part of a vibration generator towards an object to irradiate said object, said light having wavelength that is absorbable by said object, and causing energy of said light to be absorbed by said object to thereby cause vibrations in said object;
    detecting said vibrations caused in said object by a plurality of vibration detectors;
    using a frequency analyzer to calculate resonance frequency of said object by frequency analysis of said detected vibrations and calculating thickness of said object from said calculated resonance frequency; and
    using a sound speed analyzer of said frequency analyzer to calculate speed of sound inside said object from vibrations detected by said plurality of vibration detectors.

11. The method of claim 10 wherein said light is converged by a light-converging device to irradiate said object.

12. The method of claim 10 wherein said light is pulsed light.

13. A method of measuring thickness of an object, said method comprising the steps of:
    causing pulsed light to be emitted a plural number of times from a light-emitting part of a vibration generator towards an object to irradiate said object, said light having wavelength that is absorbable by said object, and causing energy of said light to be absorbed by said object to thereby cause vibrations in said object;
    detecting said vibrations caused in said object by a vibration detector; and
    using a frequency analyzer to calculate resonance frequency of said object by frequency analysis of said detected vibrations and calculating thickness of said object from said calculated resonance frequency;
    moving said vibration detector to one of different positions each time said light-emitting part emits pulsed light; and
    calculating speed of sound inside said object from the vibrations detected at said different positions by said vibration detector.

14. The method of claim 13 wherein said light is converged by a light-converging device to irradiate said object.

* * * * *